United States Patent
Lei et al.

(10) Patent No.: US 12,236,071 B2
(45) Date of Patent: Feb. 25, 2025

(54) MULTIMEDIA ANNOTATION METHOD AND DEVICE, AND STORAGE MEDIUM

(71) Applicant: BOE Technology Group Co., Ltd., Beijing (CN)

(72) Inventors: Liping Lei, Beijing (CN); Honglei Zhang, Beijing (CN); Wenchu Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 46 days.

(21) Appl. No.: 17/781,090

(22) PCT Filed: May 17, 2021

(86) PCT No.: PCT/CN2021/094221
§ 371 (c)(1),
(2) Date: May 31, 2022

(87) PCT Pub. No.: WO2021/258917
PCT Pub. Date: Dec. 30, 2021

(65) Prior Publication Data
US 2023/0004281 A1    Jan. 5, 2023

(30) Foreign Application Priority Data
Jun. 22, 2020 (CN) .......................... 202010573140.3

(51) Int. Cl.
G06F 3/04845 (2022.01)
G06F 3/0481 (2022.01)
G06F 3/0488 (2022.01)

(52) U.S. Cl.
CPC ........ G06F 3/04845 (2013.01); G06F 3/0481 (2013.01); G06F 3/0488 (2013.01);
(Continued)

(58) Field of Classification Search
None
See application file for complete search history.

(56) References Cited

U.S. PATENT DOCUMENTS 5,572,649 A * 11/1996 Elliott .................. G06F 3/0481
715/788
11,429,263 B1 * 8/2022 Peterson ................ G06F 3/011
(Continued)

FOREIGN PATENT DOCUMENTS

| CN | 102385455 A | 3/2012 |
|----|-------------|--------|
| CN | 103955339 A | 7/2014 |

(Continued)

OTHER PUBLICATIONS

First CNOA issued in Application No. 202010573140.3 dated Apr. 26, 2021, with English translation,(24p).
(Continued)

Primary Examiner — Mandrita Brahmachari
(74) Attorney, Agent, or Firm — Arch & Lake LLP (57) ABSTRACT

Provided are an intelligent interaction device and method, and a non-transitory computer readable storage medium. The method includes: displaying, on a touch screen, a current window of a multimedia file in a playing state; displaying, in response to an instruction from a user for zooming the current window, a zoomed window of the current window at a first predetermined position of the current window, the zoomed window being smaller than the current window; and displaying, in response to an annotation operation performed by the user for the zoomed window, an annotation in the zoomed window, and updating the current window by displaying the annotation in the current window.

15 Claims, 5 Drawing Sheets

```
┌──────────────────────────────────────────────────────────┐
│ Displaying on a touch screen a current window of a       │── S110
│ multimedia file in a playing state                       │
└──────────────────────────────────────────────────────────┘
                            │
┌──────────────────────────────────────────────────────────┐
│ Displaying, in response to an instruction from a user    │
│ for zooming the current window, a zoomed window of the   │── S120
│ current window at a first predetermined position of the  │
│ current window, the zoomed window being smaller than     │
│ the current window                                       │
└──────────────────────────────────────────────────────────┘
                            │
┌──────────────────────────────────────────────────────────┐
│ Displaying, in response to an annotation operation       │
│ performed by the user for the zoomed window, an          │── S130
│ annotation in the zoomed window, and updating the        │
│ current window by displaying the annotation in the       │
│ current window                                           │
└──────────────────────────────────────────────────────────┘
```

(52) U.S. Cl.
CPC .............. *G06F 2203/04803* (2013.01); *G06F 2203/04806* (2013.01)

(56) References Cited

U.S. PATENT DOCUMENTS

| | | | | |
|---|---|---|---|---|
| 2010/0085383 | A1* | 4/2010 | Cohen | G06T 3/40 345/660 |
| 2011/0113354 | A1 | 5/2011 | Thiyagarajan et al. | |
| 2012/0072836 | A1* | 3/2012 | Chiu | G06F 40/58 715/259 |
| 2013/0067474 | A1* | 3/2013 | Edmonds | G06F 9/485 718/100 |
| 2013/0241829 | A1 | 9/2013 | Kim | |
| 2015/0042675 | A1* | 2/2015 | Burke | G06T 11/60 345/629 |
| 2015/0095843 | A1 | 4/2015 | Greborio et al. | |
| 2016/0019298 | A1* | 1/2016 | Brodie | G06F 16/9535 707/734 |
| 2016/0034646 | A1* | 2/2016 | Acharya | G16H 10/60 705/3 |
| 2016/0267068 | A1* | 9/2016 | Nagarajan | G06F 16/9558 |
| 2017/0347153 | A1* | 11/2017 | Zuo | H04N 21/440263 |
| 2017/0364221 | A1 | 12/2017 | Bacus et al. | |
| 2017/0371500 | A1* | 12/2017 | Matsuda | G06F 3/1454 |

FOREIGN PATENT DOCUMENTS

| | | | |
|---|---|---|---|
| CN | 104267871 | A | 1/2015 |
| CN | 104484111 | A | 4/2015 |
| CN | 104765542 | A | 7/2015 |
| CN | 104808905 | A | 7/2015 |
| CN | 107562261 | A | 1/2018 |
| CN | 104765542 | B | 6/2018 |
| CN | 108196780 | A | 6/2018 |
| CN | 108415658 | A | 8/2018 |
| CN | 108646947 | A | 10/2018 |
| CN | 108932144 | A | 12/2018 |
| CN | 109218514 | A | 1/2019 |
| CN | 109324745 | A | 2/2019 |
| CN | 109407898 | A * | 3/2019 |
| CN | 110688190 | A | 1/2020 |
| CN | 110716680 | A | 1/2020 |
| CN | 110928475 | A | 3/2020 |
| CN | 111722781 | A | 9/2020 |
| WO | 2015047965 | A1 | 4/2015 |

OTHER PUBLICATIONS

The Decision of Rejection of CNIPA issued in Application No. 202010573140.3 dated Nov. 11, 2021, with English translation,(16p).
Written Opinion and ISR issued in Application No. PCT/CN2021/094221, dated Aug. 23, 2021,(8p).
Li, Xueqin, "Electronic Whiteboard Helps Your Courseware Be More Successful", (3p).
International Search Report of PCT/CN2021/094221 dated Aug. 23, 2021 with English translation (4p).

* cited by examiner

MULTIMEDIA ANNOTATION METHOD AND DEVICE, AND STORAGE MEDIUM

CROSS-REFERENCE TO RELATED APPLICATIONS

The present disclosure is a national phase entry under 35 U.S.C. § 371 of International Application No. PCT/CN2021/094221, filed on May 17, 2021 and claims the priority of the Chinese Patent Application No. 202010573140.3, filed on Jun. 22, 2020, and titled "INTELLIGENT INTERACTION METHOD, DEVICE, AND STORAGE MEDIUM," the entire contents of which are hereby incorporated by reference in their entireties.

TECHNICAL FIELD

The present disclosure relates to the field of information display technology, and in particular, to an intelligent interaction method, device, and non-transitory computer readable storage medium.

BACKGROUND

With the rapid development of display technology, the application of larger touch screens is becoming more and more widespread.

It is difficult for the users to annotate or perform operation for the content displayed on the larger touch screen due to the large touch screen, and the operation is inefficient, if the user annotates directly with the cursor.

It should be noted that the information disclosed in the "BACKGROUND" section is intended only to enhance the understanding of the context of this disclosure and may therefore include information that does not constitute prior art known to those of ordinary skill in the art.

SUMMARY

The present disclosure provides an intelligent interaction method, device, and non-transitory computer readable storage medium.

Other features and advantages of the present disclosure will become apparent through the following detailed description, or will be learned in part through the practice of the present disclosure.

According to a first aspect of the present disclosure, there is provided an intelligent interaction method for annotation scenarios, executed by a processor, including: displaying, by the processor, on a touch screen a current window of a multimedia file in a playing state; displaying, by the processor, in response to an instruction from a user for zooming the current window, a zoomed window of the current window at a first predetermined position of the current window, the zoomed window being smaller than the current window; and displaying, by the processor, in response to an annotation operation performed by the user for the zoomed window, an annotation in the zoomed window, and updating the current window by displaying the annotation in the current window.

According to a second aspect of the present disclosure, there is provided an intelligent interaction method, including: displaying, by a processor, on a touch screen a current window of a multimedia file in a playing state; displaying, by the processor, in response to an instruction from a user for zooming the current window, a zoomed window of the current window on the touch screen with the current window maintained; and switching, by the processor, in response to a control operation performed by the user for the zoomed window, from displaying a first content in the current window to displaying a second content in the current window, wherein the second content is displayed in the zoomed window corresponding to the control operation.

According to a third aspect of the present disclosure, there is provided an intelligent interaction device for annotation scenarios, including: a touch screen, one or more processors coupled to the touch screen, and a memory for storing one or more programs that, when executed by the one or more processors, cause the one or more processors to implement the intelligent interaction method as described in any one of the foregoing embodiments.

According to a fourth aspect of the present disclosure, there is provided a non-transitory computer readable storage medium, storing a computer program, where the computer program, when executed by one or more processors, implements the intelligent interaction method as described in any one of the foregoing embodiments.

It should be understood that both the foregoing general description and the following detailed description are exemplary and explanatory only and not for limiting the present disclosure.

BRIEF DESCRIPTION OF THE ACCOMPANYING DRAWINGS

Accompanying drawings herein, which are incorporated into and constitute a part of the specification, illustrate embodiments conforming to the present disclosure, and are used to explain the principles of the present disclosure in conjunction with the specification. It will be apparent that the accompanying drawings in the following description only show some of the embodiments of the present disclosure, and that other drawings may be obtained from them without any creative efforts by one of ordinary skill in the art.

DETAILED DESCRIPTION

Exemplary embodiments will now be described more fully with reference to the accompanying drawings. However, the exemplary embodiments may be implemented in various forms and should not be construed as limited to the examples set forth herein; rather, these embodiments are provided so that the present disclosure will be more comprehensive and complete, and will fully convey the concept of exemplary embodiments to those skilled in the art. The described features, structures, or characteristics may be combined in any suitable manner in one or more embodiments.

In addition, the accompanying drawings are merely schematic illustrations of the present disclosure and are not necessarily drawn to scale. The same reference numerals in the drawings indicate the same or similar structures, and thus their detailed description will be omitted. Some of the block diagrams shown in the accompanying drawings are functional entities and do not necessarily have to correspond to physically or logically separate entities. These functional entities may be implemented in software form, or in one or more hardware modules or integrated circuits, or in different network and/or processor devices and/or microcontroller devices.

Figure 1:
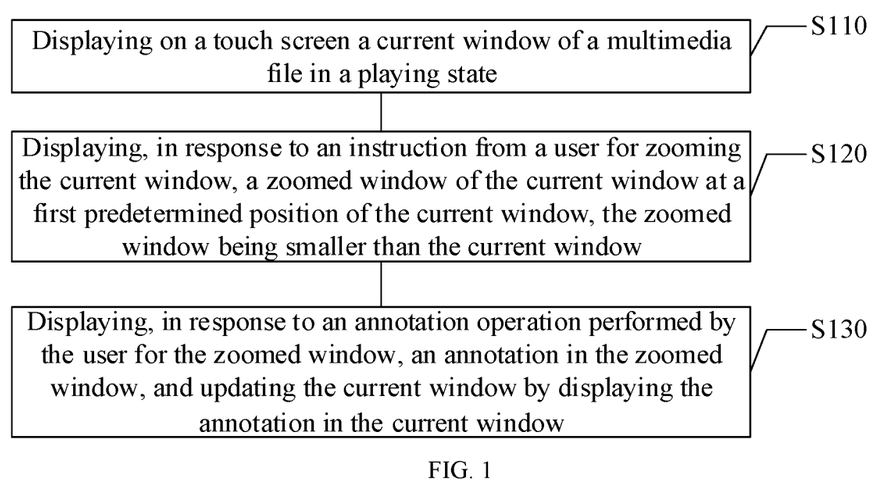
FIG. 1 schematically illustrates a flow chart of steps performed by a processor of an intelligent interaction device in one exemplary embodiment of the present disclosure.

In the exemplary embodiments, there is first provided an intelligent interaction method that can be applied to annotation scenarios of the content displayed on the touch screen. With reference to FIG. 1, the method includes the following steps performed by the processor of the device.

S110, displaying on a touch screen a current window of a multimedia file in a playing state.

S120, displaying, in response to an instruction from a user for zooming the current window, a zoomed window of the current window at a first predetermined position of the current window, the zoomed window being smaller than the current window.

S130, displaying, in response to an annotation operation performed by the user for the zoomed window, an annotation in the zoomed window, and updating the current window by displaying the annotation in the current window.

In the intelligent interaction device provided according to the exemplary embodiments, the annotation of a certain area of the current window is completed by setting the zoomed window at the first predetermined position, and the area of the zoomed window is smaller than the current window, so that the user can directly annotate the zoomed window by touch, thus completing the annotation of the current window, which is simple to operate and improves the user experience. Users can annotate in the small window without having to move to the large window, making it easier for users who are not tall enough or cannot easily walk to the large window.

In an exemplary embodiment of the present disclosure, the touch screen is used to display a multimedia file, and is capable of receiving a touch operation performed by the user, or receiving an instruction of a gesture operation performed by the user for the touch screen, or receiving a trigger operation performed by the user for a key on the touch screen. The processor may be integrated in the touch screen, or may be connected to the touch screen through the network information, or may be connected through the circuits, which is not specifically limited in this exemplary embodiment.

The various steps of the intelligent interaction method in the exemplary embodiments will be described below in more detail in conjunction with the accompanying drawings and examples.

At step S110, a current window of a multimedia file in a playing state is displayed on a touch screen.

In an exemplary embodiment of the present disclosure, the processor may respond to the user's operation of opening a file on the touch screen, and display the multimedia file on the touch screen. The multimedia file may include text (such as Word, PPT, and other types of documents), video, images (such as photos or screenshots, etc.), etc., without specific limitation in this exemplary embodiment. The user can open the file by touch, gesture, and other open operations for multimedia files, so that the multimedia files are displayed on the touch screen.

In another exemplary embodiment of the present disclosure, displaying the current window of the multimedia file in the playing state on the touch screen can be performed by the processor displaying the multimedia file of other devices on the touch screen by receiving and responding to a screen projection command from other devices. The other devices can be screen transmitters or mobile terminals. The mobile terminals can be cell phones, tablet computers, computers, and other terminal devices, or devices with similar functionality and application scenarios as the touch screen, such as a screen projection between two electronic whiteboards or between two conference machines, which are not specifically limited in this exemplary embodiment.

The touch screen and processor can be the display board and processor of an intelligent interaction device. The intelligent interaction device is the electronic whiteboard, conference machine, educational machine and other intelligent terminal equipment.

In this exemplary embodiment, the other device sends a screen projection command to the intelligent interaction device, and the processor receives the command and displays the content to be projected from the other device on the touch screen.

At step S120, a zoomed window of the current window is displayed at a first predetermined position of the current window in response to an instruction from a user for zooming the current window, the zoomed window being smaller than the current window.

Figure 2:
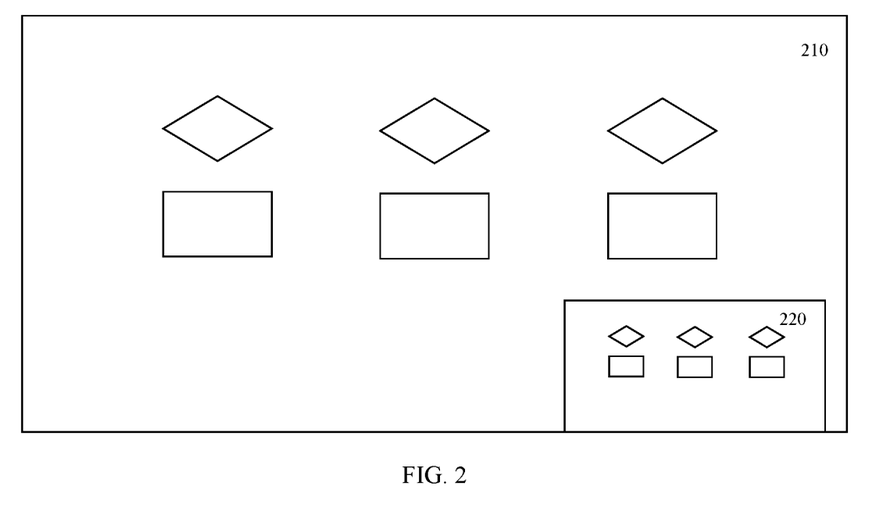
FIG. 2 schematically illustrates a diagram of generating a zoomed window at a current user interface in exemplary embodiments of the present disclosure.
Figure 3:
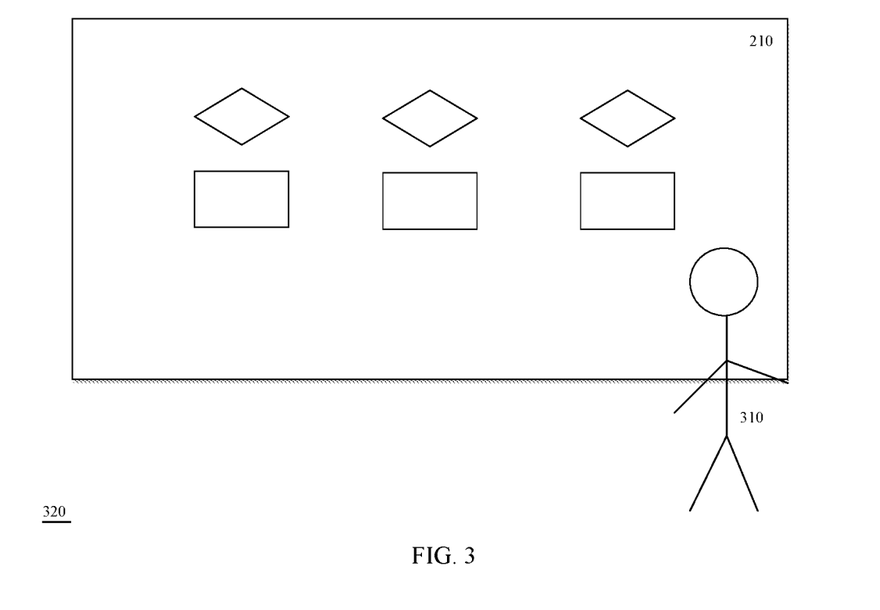
FIG. 3 schematically illustrates a diagram of a position of a user in relation to a touch screen in exemplary embodiments of the present disclosure.

In an exemplary embodiment of the present disclosure, referring to FIG. 2 and FIG. 3, displaying, in response to the instruction from the user 310 for zooming the current window, the zoomed window 220 of the current window 210 at the first predetermined position of the current window 210 may include displaying, in response to a swipe operation performed by the user 310 in a first direction on the current window 210, the zoomed window 220 of the current window 210 at the first predetermined position.

The touch screen is at a certain distance from the ground 320 when in use, such as 1 m, 1.2 m, 2 m, etc., and the distance is fixed if the position of the touch screen or the position of the remote control command to control the lift is fixed.

The first predetermined position may be preset by the user, for example, the system default position, or set by the user according to the settings page before starting the function of this application. The first predetermined position may be selected by the user from multiple pre-stored positions, or selected by the user according to the visual virtual desktop display.

In some other embodiments of the present disclosure, the first predetermined position may be determined based on the current position of the user 310, i.e., the processor detects the current position of the user 310 and determines a position at a preset distance from the current position of the user 310 as the first predetermined position. Specifically, the zoomed window 220 may be generated at a position less than 1 meter from the user 310 based on the current position of the user 310, so that the user 310 can more easily make annotations in the zoomed window 220. In another exemplary embodiment, the processor collects the current position of the user by means of image capture and determines the user's orthographic projection area on the touch screen based on the user's current position, and the center of the orthographic projection area on the touch screen can be used as the first predetermined position.

In the exemplary embodiments, the predetermined position may also be set directly by the user in the processor. For example, the first predetermined position is set in the area close to the lower left corner or the area close to the lower right corner of the current window 210, or close to the lower left corner or the lower right corner of the touch screen, or close to the middle of the side frame.

In the exemplary embodiments, the first direction described above may be a direction towards the first predetermined position, i.e., the direction in which the user 310 slides on the screen towards the desired zoomed window position, and then the zoomed window is generated at the first predetermined position.

In the exemplary embodiments, the area of the zoomed window is smaller than the area of the current window. The size of the zoomed window may be one-third, one-fourth, one-fifth, one-eighth, one-sixteenth, etc. of the current window, or it may be customized according to the current window and the user's height, which is not specifically limited in this exemplary embodiment.

Figure 4:
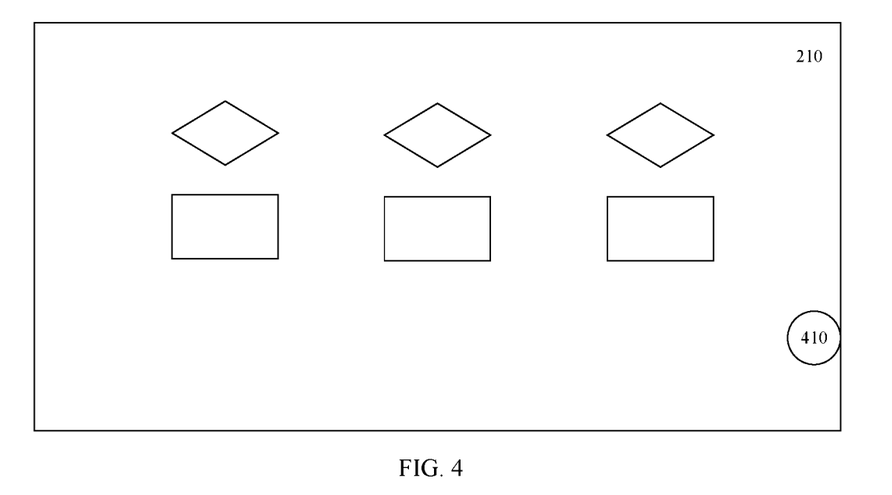
FIG. 4 schematically illustrates a diagram in which a zoom icon is displayed in a current window in exemplary embodiments of the present disclosure.

In another exemplary embodiment of the present disclosure, referring to FIG. 4, displaying, in response to an instruction from a user for zooming the current window 210, a zoomed window of the current window 210 at a first predetermined position of the current window 210 may be that the processor generates the zoomed window at the first predetermined position in response to a trigger operation performed by the user on a zoom icon 410 displayed in the current window 210.

In the exemplary embodiments, the display position of the zoom icon 410 may be the first predetermined position, or may be set according to the current position of the user, or may be set directly by the processor. For example, the zoom icon 410 is set in the lower left or lower right corner of the current window 210. When the user needs to open the zoomed window, the user can click on the zoom icon 410 to display the zoomed window at the first predetermined position, and then the zoom icon 410 is no longer displayed. After the user closes the zoomed window, the display of the zoom icon 410 is restored.

In an exemplary embodiment of the present disclosure, after generating the zoomed window, the processor controls the current window 210 to stop receiving user instructions, i.e., the user's operation on the current window 210 is invalidated, and the processor receives only the user's operation on the zoomed window, which can prevent misuse of the current window 210 when operating on the zoomed window.

In a further exemplary embodiment of the present disclosure, the zoomed window displays only a portion of the current window, and the displayed portion may be determined according to the user's operation. For example, the user frames a portion of the content by the cursor, and when the processor receives the instruction from the user for zooming the current window, it displays the framed portion of the content in the zoomed window.

In the exemplary embodiments, the content displayed in the zoomed window can also be set directly by the processor, for example, the processor divides the current window into a preset number of sub-display regions of equal size, and displays the content of the first sub-display region by default when receiving the instruction from the user for zooming the current window. In this case, the processor can respond to the user's switching operation to display the content of other sub-display regions, for example, the user double-clicks a position of the current page with the cursor, the processor detects which sub-display region the user double-clicks and displays the content of the sub-display region where the double-click position is located in the zoomed window.

It should be noted that there are various ways of switching operations by the user, and the above description is exemplary and is not specifically limited in the exemplary embodiments.

At step S130, in response to an annotation operation performed by the user for the zoomed window, an annotation is displayed in the zoomed window and the current window is updated by displaying the annotation in the current window.

In an exemplary embodiment of the present disclosure, in response to the annotation operation performed by the user for the zoomed window, displaying the annotation in the zoomed window and updating the current window by displaying the annotation in the current window may be synchronizing the content of the annotation in the current window when the user annotates. Specifically, the processor may intercept the display content of the zoomed window at intervals of a third predetermined time and replace the display content of the current window with the intercepted display content of the zoomed window at intervals of the third predetermined. In the replacement, the proportional relationship between the sizes of the zoomed window and the current window may be determined first, the display content of the zoomed window is zoomed in according to the proportional relationship to replace the display content of the current window.

In the exemplary embodiments, the third predetermined time can be set by the user and may be 0.01 seconds, 0.02 seconds, etc. The third predetermined time can also be customized according to the processing accuracy and processing efficiency of the processor and can be set smaller when the processing accuracy of the processor is high to improve the display accuracy and display effect of the current window.

Figure 5:
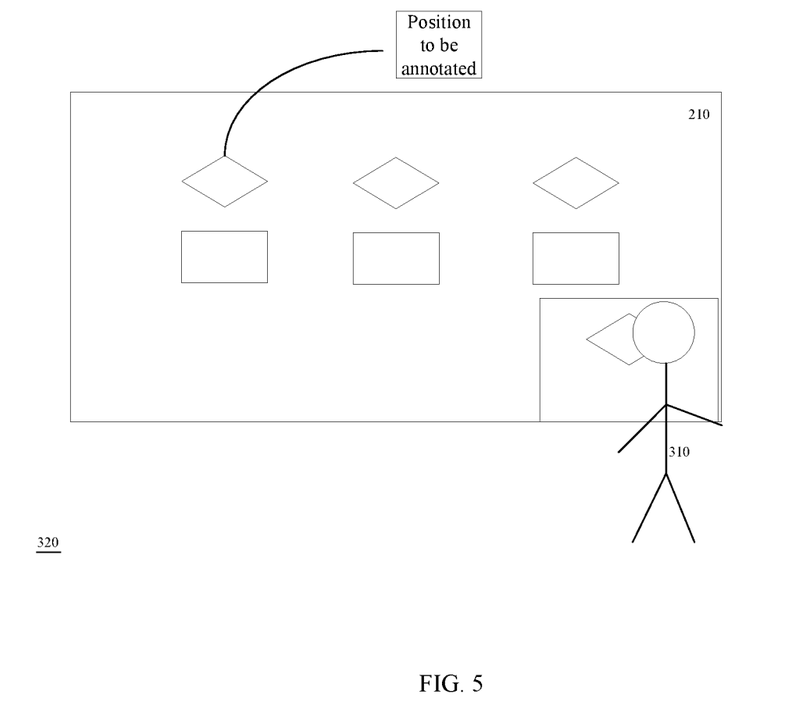
FIG. 5 schematically illustrates a diagram in which a predetermined region is enlarged and annotated with comments in exemplary embodiments of the present disclosure.

In another exemplary embodiment of the present disclosure, referring to FIG. 5, in response to the annotation operation performed by the user 310 for the zoomed window, displaying the annotation in the zoomed window, and updating the current window by displaying the annotation in the current window 210 may be that the current window is updated by displaying the annotation after the user 310 completes the annotation. Specifically, the processor detects the operation information of user 310 on the zoomed window in real time, and enlarges the content of the zoomed window and displays it in the current window 210 when no operation information of the user 310 is detected at the first predetermined time. That is, the display content of the zoomed window is displayed in the current window 210 when the user 310 does not perform any operation on the zoomed window at the first predetermined time. By displaying the annotation to update the current window after the user completes the annotation, the user 310 can make changes in time when annotates incorrectly without displaying it in the current window 210. For example, in a teaching scenario, it can prevent a large number of students from recording wrong notes due to errors in the instructor's annotation.

In the exemplary embodiments, the first predetermined time can be set by the user or automatically set by the processor, e.g., 3 seconds, 4 seconds, or can be customized according to the needs, which is not specifically limited in the exemplary embodiments.

In the exemplary embodiments, the processor may respond to the zoom-in operation performed by the user 310 on the preset area of the zoomed window, and display the content of the zoomed-in preset area on the zoomed window. Zooming in on the preset area enables the user 310 to annotate the preset area more clearly. For example, when it is necessary to annotate a smaller part of the zoomed window, it is not easy to complete the annotation due to the smaller part, so that the zoom-in operation helps to complete the annotation more conveniently. Since the annotation is still in progress, the current window 210 does not display the content of the zoomed window.

In the exemplary embodiments, when the processor does not detect the operation of the user 310 for the zoomed-in preset area within the second predetermined time, it retains the annotation of the preset area and restores the preset area to the initial size. The second predetermined time is less than the first predetermined time described above. The second predetermined time may be set by the user or automatically set by the processor, and may be 2 seconds, 1 second, etc., or may be customized according to the needs, which is not specifically limited in the exemplary embodiments.

In an exemplary embodiment of the present disclosure, after displaying the zoomed window of the current window at the first predetermined position of the current window, when the number of users is multiple, i.e., when there are multiple users using the intelligent interaction device at the same time, for example, when two or more users need to annotate the current window, the processor may, in response to a copy operation performed by the user for the zoomed window or another instruction from the user for zooming the current window, generate at least one sub-zoomed window in the current window. Specifically, the user can long press the zoomed window to copy the zoomed window, and the processor, upon receiving the user's long press operation, feeds back to the user a signal that the zoomed window has been copied and generates a sub-zoomed window misaligned with the zoomed window. The sub-zoomed window can move on the current window with the drag operation performed by the user, i.e. the sub-zoomed window is a floating window. The end of the drag operation is the display position of the sub-zoomed window.

In the exemplary embodiments, the copy operation may also be an operation in which the user swipes in the opposite direction of the zoomed window to generate a sub-zoomed window. Alternatively, the sub-zoomed window may be generated by the processor receiving and responding to the user's gesture of swiping outwards with both hands on the zoomed window. There are various ways to perform the copy operation, which are not specifically limited in the exemplary embodiments.

In the exemplary embodiments, the sub-zoomed window and the zoomed window display the same content at all times, which can make it easier and faster for multiple users to complete the cooperative annotation. For example, in the teaching scenario, when the lecturer asks two students to solve the two topics displayed on the current window, they can start solving them at the same time, instead of solving them one by one, which can save time.

In another exemplary embodiment, the display contents of the sub-zoomed window and the zoomed window are not synchronized, and after the annotation is completed in the sub-zoomed window, the annotation contents of the sub-zoomed window are also displayed in the current window. For example, in the teaching scenario, the instructor asks two students to do the same topic, in order to prevent the students from copying each other, the contents of the sub-zoomed window and the zoomed window can be unsynchronized, and after all the annotations are completed, the contents of the annotations are displayed in the current window. In this case, in order to prevent the overlapping of the two annotations from causing confusion, the annotation position can be pre-defined during annotation.

After the user finishes annotating, the processor can close the display of the sub-zoomed window or the zoomed window in response to a close operation performed by the user for the zoomed window or the sub-zoomed window.

In the exemplary embodiments, the close operation may be a gesture operation of the user pressing down on the sub-zoomed window or zoomed window, or may be that there is a close icon displayed in the upper right corner of the zoomed window and sub-zoomed window, and the user triggers the close icon to close the sub-zoomed window or the zoomed window.

It should be noted that there are various ways to perform the close operation, which may be customized according to the needs and preferences of the user and are not specifically limited in the exemplary embodiments.

Figure 6:
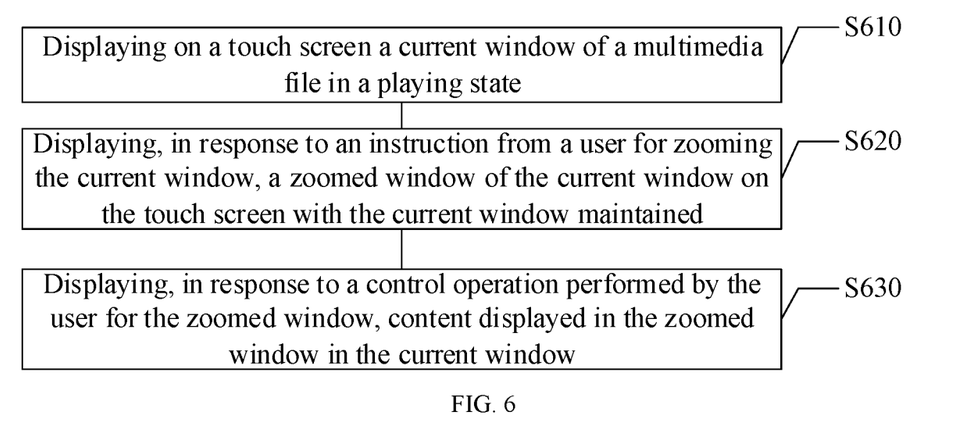
FIG. 6 schematically illustrates a flow chart of the steps performed by the processor of the intelligent interaction device in another exemplary embodiment of the present disclosure.

The present disclosure also provides an intelligent interaction method that can be applied to a scenario of annotating content displayed on a touch screen and performed by an intelligent interaction device. The intelligent interaction device can include the touch screen and a processor. With reference to FIG. 6, the intelligent interaction method can include the following steps.

S610, displaying, by the processor, on the touch screen a current window of a multimedia file in a playing state.

S620, displaying, by the processor, in response to an instruction from a user for zooming the current window, a zoomed window of the current window on the touch screen with the current window maintained.

S630, switching, by the processor, in response to a control operation performed by the user for the zoomed window, from displaying a first content in the current window to displaying a second content in the current window, wherein the second content is displayed in the zoomed window corresponding to the control operation.

In the intelligent interaction method provided in the exemplary embodiments, compared to the prior art, the annotation of the current window is completed by setting the zoomed window at the first predetermined position, and the area of the zoomed window is smaller than that of the current window, so that the user can directly annotate the zoomed window by touching, thus completing the annotation of the current window, which is simple to operate and enhances the user experience.

In an exemplary embodiment of the present disclosure, the touch screen is used to display a multimedia file, which can receive the touch operation performed by the user, or receive an instruction of gesture operation performed by the user for the touch screen, or receive a trigger operation performed by the user for a key on the touch screen. The processor can be integrated in the touch screen, or can be connected to the touch screen through the network information, or can be connected through the circuits, which is not specifically limited in the exemplary embodiment.

The steps in the intelligent interaction method in the exemplary embodiments will be described in more detail below in conjunction with the accompanying drawings and examples.

At step S610, a current window of a multimedia file in a playing state is displayed on a touch screen.

In an exemplary embodiment of the present disclosure, the processor may respond to the user's operation of opening a file on the touch screen, and display the multimedia file on the touch screen. The multimedia file may include text, video, images, etc., without specific limitation in this exemplary embodiment. The user can open the file by touch, gesture, and other open operations for multimedia files, so that the multimedia files are displayed on the touch screen.

In another exemplary embodiment of the present disclosure, displaying the current window of the multimedia file in the playing state on the touch screen can be performed by the processor displaying the multimedia file of other devices on the touch screen by receiving and responding to a screen projection command from other devices. The other devices can be cell phones, tablets, computers and other terminal devices with touch screens.

At S620, in response to an instruction from a user for zooming the current window, a zoomed window of the current window is displayed on the touch screen with the current window maintained.

In an exemplary embodiment of the present disclosure, the zoomed window is generated at the first predetermined position of the current window in response to the instruction form the user for zooming the current window, and the zoom operation and the determination of the first predetermined position have been explained in detail above and will not be repeated here.

In the exemplary embodiments, the specific way to perform the zoom operation has been explained in detail above and will not be repeated here.

In another exemplary embodiment of the present disclosure, the current window is displayed in full screen on the touch screen, and during the formation of the zoomed window, the display area of the current window on the touch screen may be zoomed out first, so that the zoomed window can be displayed at a second predetermined position of the touch screen. The relationship between the sizes of the zoomed window and the current window has been explained in detail above and will not be repeated here.

In the exemplary embodiment, the touch screen can be set perpendicular to the ground, the processor can detect the current position of the user and determine the second predetermined position based on the current position of the user. Specifically, the processor can set the second predetermined position in a more convenient place for the user based on the current position of the user. For example, the second predetermined position is set at the edge of the touch screen which is close to user. The second predetermined position is not specifically limited in the exemplary embodiment.

Figure 8:
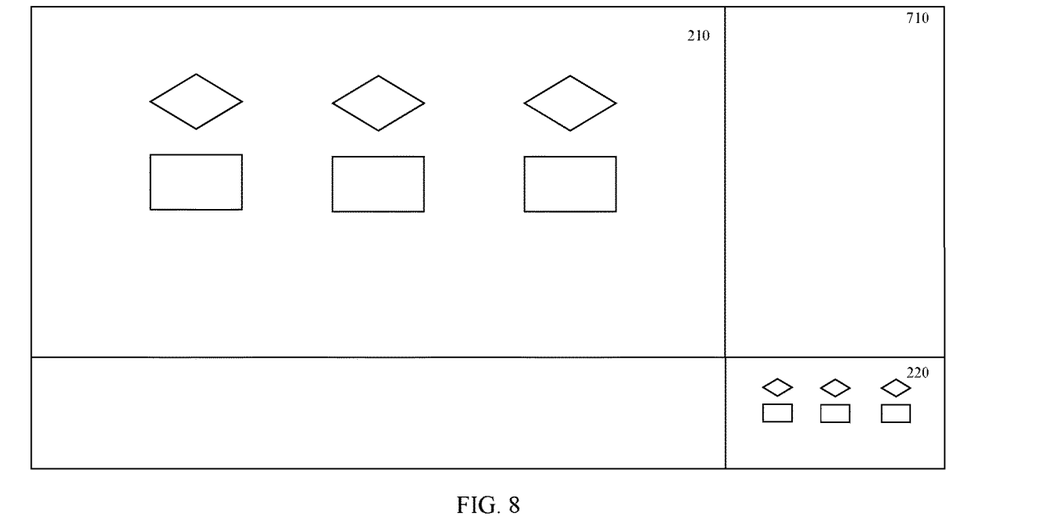
FIG. 8 schematically illustrates a schematic diagram in which the zoomed window is displayed on the touch screen other than the current window in another exemplary embodiment of the present disclosure.

In another exemplary embodiment of the present disclosure, referring to FIG. 8, the second predetermined position can be directly customized by the processor. Specifically, after zooming out the display area of the current window 210, the zoomed window 220 may be formed in the lower left or lower right corner of the touch screen 710, the diagonal lines of the zoomed window 220 and the current window 210 are located in the same line and overlap with the diagonal line of the touch screen 710. In this case, the length and width of the current window are scaled down proportionally, and thus the display effect is not changed.

In the exemplary embodiment, the second predetermined position may be preset by the user, for example, the system default position, or set by the user according to the settings page before starting the function of this application. The second predetermined position may be selected by the user from multiple pre-stored positions, or selected by the user according to the visual virtual desktop display.

Figure 7:
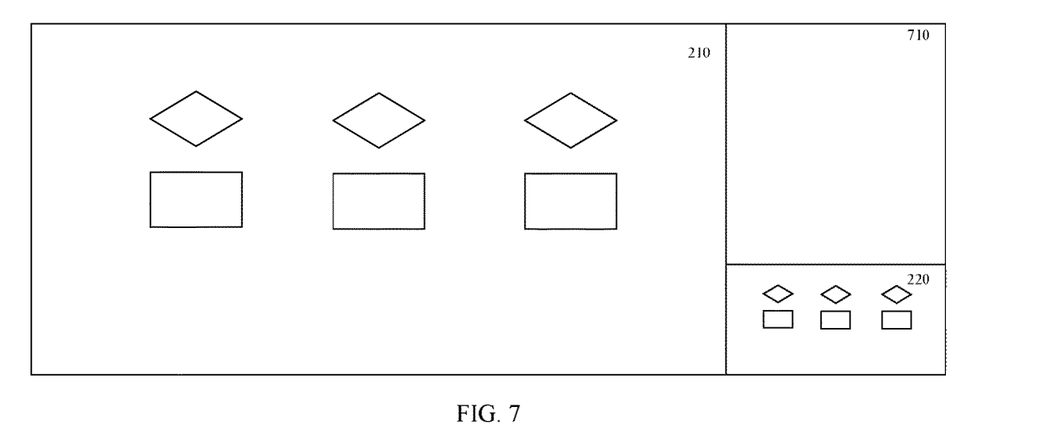
FIG. 7 schematically illustrates a schematic diagram in which the zoomed window is displayed on the touch screen other than the current window in one exemplary embodiment of the present disclosure.

In a further exemplary embodiment of the present disclosure, with reference to FIG. 7, the second predetermined position may also be set directly by the processor. Specifically, after zooming out the current window 210, the current window 210 is displayed on one side of the touch screen 710, and the display area of the current window may be compressed to the side away from the ground, or to the left, or to the right. The zoomed window 220 is formed on the area formed after the compression.

In other exemplary embodiments of the present disclosure, the current window is displayed on the touch screen 710 in a non-full screen, that is, when forming the zoomed window 220, instead of performing the above-mentioned operation of zooming out the current window 210, the zoomed window 220 is formed in the area other than the area where the current window 210 is displayed on the touch screen 710. The specific formation method has been described in detail above and will not be repeated here.

At step S630, in response to a control operation performed by the user for the zoomed window, the current window is switched from displaying a first content to displaying a second content, where the second content is displayed in the zoomed window corresponding to the control operation.

In an exemplary embodiment of the present disclosure, the control operation may include annotation operation, zoom-in operation, deletion operation, etc. The annotation operation is to annotate the content of the playback. The zoom-in operation can be applied when the user needs to zoom in on the displayed content for viewing, and the content displayed on the zoomed window is displayed in the current window by the user performing the zoom-in operation for the zoomed window. The zoom-in operation can be an operation where the user uses two fingers to click and stretch outward at the same time for a predetermined part of the zoomed window, or it can be customized according to the user's needs, and is not specifically limited in the exemplary embodiment.

In the exemplary embodiment, the delete operation is used to delete part of the multimedia file, which can be used in conjunction with the annotation operation, i.e., when an error occurs in the annotation, or when one of the annotations is no longer needed, the delete operation can be used to delete the unwanted part of the annotation, or delete part of the multimedia file, and the delete operation can be done by the user clicking on the part to be deleted and jiggling, or can be customized according to the user's needs, and is not specifically limited in the exemplary embodiment.

In the exemplary embodiment, the processor can display the content of the zoomed window on the current window after completing all operations on the zoomed window, or it can synchronize the operations on the zoomed window to the current window directly. The specific execution process of the two display methods has been explained in detail at step S130 above and will not be repeated here.

In the exemplary embodiment, the processor of the intelligent interaction device may also perform a restore operation for the current window, store the changed contents of the current window, i.e., the changed display contents after the completion of the annotation operation and other operations, and restore the display contents of the current window to the initially displayed contents, i.e., the initial display contents when the annotation operation and other operations were not performed.

In the exemplary embodiment, after hiding the contents corresponding to the control operation, when the user needs to call out the contents corresponding to the control operation again, the changed display content matched the initial display content can be obtained from the storage library using the initial display content, and the initial display content can be replaced with the changed display content in response to the user's recall operation, and then the display of the contents corresponding to the control operation can be completed.

In the exemplary embodiment, the restore operation can be the operation of the user to swipe up for the current window, and the recall operation can be the operation of the user to swipe down for the current window. The restore operation and recall operation can also be customized according to the needs of the user, which are not specifically limited in the exemplary embodiment.

The intelligent interaction device 900 according to embodiments of the present disclosure is described below with reference to FIG. 9. The intelligent interaction device 900 shown in FIG. 9 is merely an example and shall not constitute a limitation on the functionality and scope of use of the embodiments of the present disclosure.

Figure 9:
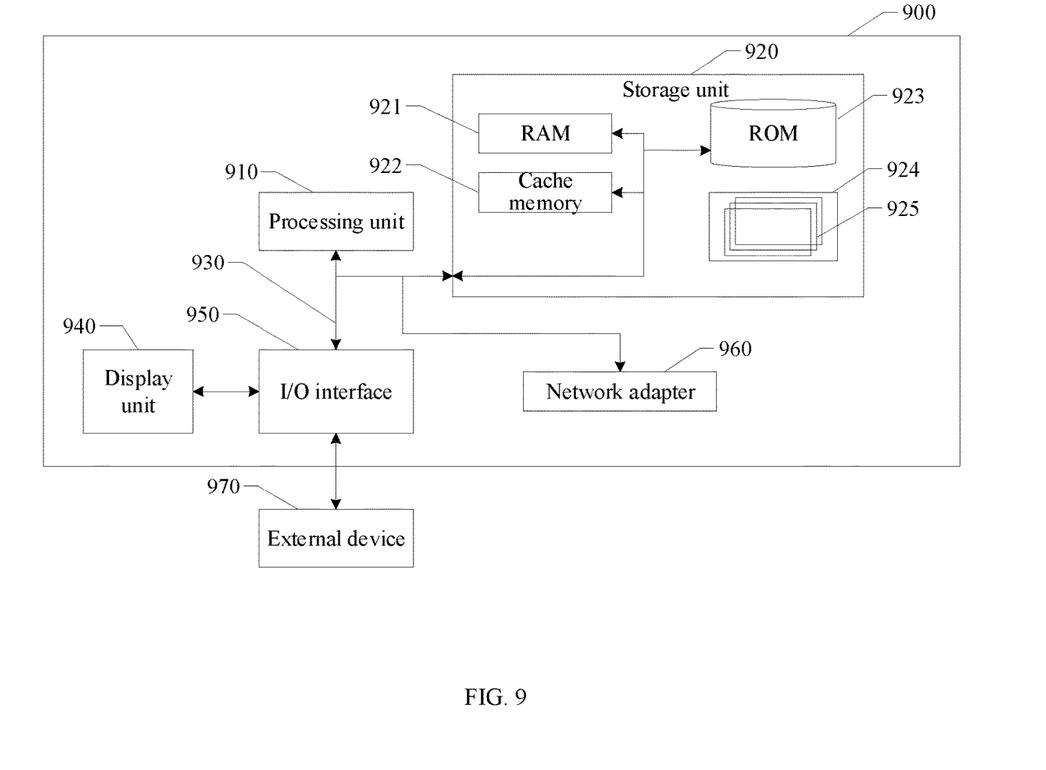
FIG. 9 schematically illustrates a structural schematic diagram of a computer system adapted to the intelligent interaction device for implementing the exemplary embodiments of the present disclosure.

As shown in FIG. 9, the components of the intelligent interaction device 900 may include, but are not limited to, at least one processing unit 910, at least one storage unit 920, a bus 930 connecting the different system components (including the storage unit 920 and the processing unit 910), and a display unit 940.

The storage unit 920 stores program code, the program code may be executed by the processing unit 910 causing the processing unit 910 to perform the steps according to various exemplary embodiments of the present disclosure as described above. For example, the processing unit 910 may perform the steps as shown in FIG. 1 or FIG. 6.

The memory unit 920 may include readable media in the form of volatile memory units, such as random access memory units (RAM) 921 and/or cache memory units 922, and may further include read-only memory units (ROM) 923.

The storage unit 920 may also include a program/utility 924 having a set of (at least one) program modules 925, such program modules 925 including, but not limited to an operating system, one or more applications, other program modules, and program data, each of these examples or some combination may be applied in a network environment.

The bus 930 may be a local bus that represents one or more of several types of bus structures, including a memory cell bus or memory cell controller, a peripheral bus, a graphics acceleration port, a processing unit, or any bus structure using any of the multiple bus structures.

The intelligent interaction device 900 may also communicate with one or more external devices 970 (e.g., keyboards, pointing devices, Bluetooth devices, etc.), with one or more devices that enable the user to interact with the intelligent interaction device 900, and/or with any device that enables the intelligent interaction device 900 to communicate with one or more other computing devices (e.g., routers, modems, etc.). This communication may be via input/output (I/O) interface 950. And, the intelligent interaction device 900 may also communicate with one or more networks (e.g., local area network (LAN), wide area network (WAN), and/or public networks, such as the Internet) through the network adapter 960. As shown in FIG. 9, network adapter 960 communicates with other modules of intelligent interaction device 900 via bus 930. It should be appreciated that although not shown in the figures, other hardware and/or software modules may be used in conjunction with the intelligent interaction device 900, including, but not limited to, microcode, device drives, redundant processing units, external disk drive arrays, RAID systems, tape drives, and data backup storage systems, among others.

According to the above description of embodiments, it is readily understood by those skilled in the art that the exemplary embodiments described herein can be implemented by means of software or by means of software combined with the necessary hardware. Thus, a technical solution according to the embodiments of the present disclosure may be embodied in the form of a software product that may be stored in a non-volatile storage medium (which may be a CD-ROM, USB flash drive, removable hard drive, etc.) or on a network, including a number of instructions to cause a computing device (which may be a personal computer, server, terminal device, or network device, etc.) to perform the method of the amendments of the present disclosure.

In exemplary embodiments of the present disclosure, there is also provided a non-transitory computer readable storage medium having stored thereon a program product capable of implementing the methods described above in this specification. In some possible embodiments, aspects of the present disclosure may also be implemented in the form of a program product including program code that, when the program product is run on a terminal device, is used to cause the terminal device to perform the steps described above according to various exemplary embodiments of the present disclosure.

Figure 10:
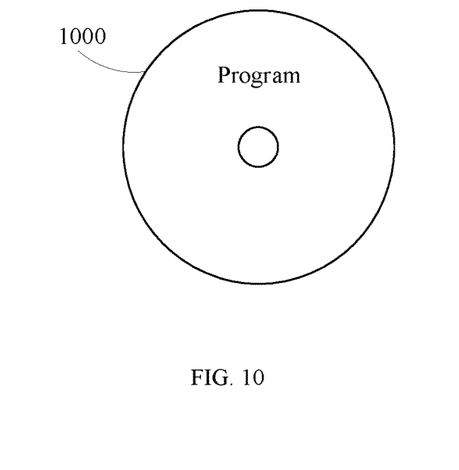
FIG. 10 schematically illustrates a diagram of a computer-readable storage medium according to some embodiments of the present disclosure.

Referring to FIG. 10, a program product 1000 for implementing the above methods according to embodiments of the present disclosure is illustrated, which may employ a portable compact disk read-only memory (CD-ROM) and include program code and may run on a terminal device, such as a personal computer. However, the program products of the present disclosure are not limited thereto, and for the purposes of this document, a readable storage medium may be any tangible medium that contains or stores a program that may be used by or in combination with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus, or device, or any combination of the above. Specific examples of readable storage media include (non-exhaustive list): electrical connections with one or more wires, portable disks, hard disks, random access memory (RAM), read-only memory (ROM), erasable programmable read-only memory (EPROM or flash memory), optical fiber, portable compact disk read-only memory (CD-ROM), optical storage devices, magnetic memory devices, or any suitable combination of the above.

The computer readable signal medium may include a data signal propagated in the baseband or as part of a carrier wave that carries readable program code. This propagated data signal can take a variety of forms, including, but not limited to, electromagnetic signals, optical signals or any suitable combination of the above. The readable signal medium may also be any readable medium other than a readable storage medium that sends, propagates, or transmits a program for use by or in conjunction with an instruction execution system, apparatus, or device.

The program code contained on the readable media may be transmitted by any suitable medium, including, but not limited to, wireless, wired, fiber optic, RF, etc., or any suitable combination of the above.

Program code for performing the operations of the present disclosure may be written in any combination of one or more programming languages, the programming languages including object-oriented programming languages, such as Java, C++, etc., and also including conventional procedural programming languages, such as "C" language or similar programming languages. The program code may be executed entirely on the user computing device, partially on the user device, as a stand-alone package, partially on the user computing device and partially on the remote computing device, or entirely on the remote computing device or server. In the case involving a remote computing device, the remote computing device may be connected to the user computing device via any kind of network, including a local area network (LAN) or a wide area network (WAN), or, alternatively, may be connected to an external computing device (e.g., using an Internet service provider to connect via the Internet).

Further, the appended drawings are merely schematic illustrations of the processing included in the methods according to exemplary embodiments of the present disclosure, and are not intended to be limiting. It should be understood that the processing shown in the accompanying drawings does not indicate or limit the temporal order of such processing. It also should be understood that these processes may be performed, for example, in multiple modules, either synchronously or asynchronously.

Other embodiments of the present disclosure will readily come to the mind of one skilled in the art upon consideration of the specification and practice of the invention disclosed herein. This disclosure is intended to cover any variation, use, or adaptation of the present disclosure that follows the general principles of the present disclosure and includes commonly known or customary technical means in the art that are not disclosed herein. The specification and embodiments are to be considered exemplary only, and the true scope and spirit of the present disclosure is indicated by the claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. An intelligent interaction method, comprising:
    displaying, by a processor, on a touch screen a current window of a multimedia file in a playing state;
    displaying, by the processor, in response to an instruction from a user for zooming the current window, a zoomed window of the current window on the touch screen with the current window maintained, wherein the zoomed window of the current window is formed in a lower left or lower right corner of the touch screen, and diagonal lines of the zoomed window and the current window are located in the same line and overlap with a diagonal line of the touch screen; and
    switching, by the processor, in response to a control operation performed by the user for the zoomed window, from displaying a first content in the current window to displaying a second content in the current window, wherein the second content is displayed in the zoomed window corresponding to the control operation.

2. The method of claim 1, wherein the current window is displayed full screen on the touch screen, and displaying a zoomed window of the current window on the touch screen comprises:
    zooming out a display area of the current window on the touch screen; and
    forming the zoomed window of the current window independently at a second predetermined position other than the display area of the current window on the touch screen.

3. The method of claim 1, wherein the current window is displayed on the touch screen in a non-full screen, and displaying a zoomed window of the current window on the touch screen comprises:
    forming the zoomed window of the current window independently at a second predetermined position other than a display area of the current window on the touch screen.

4. The method of claim 1, wherein after switching, in response to a control operation performed by the user for the zoomed window, from displaying a first content in the current window to displaying a second content in the current window, the method further comprises:
    receiving and responding to a restore operation performed by the user for the current window,
    storing the second content of the current window, and
    displaying the first content in the current window.

5. The method of claim 4, wherein when displaying the first content in the current window, the method further comprises:
    receiving and responding to a recall operation performed by the user for the current window, obtaining the second content matched the first content from a storage library using the first content; and
    replacing the first content with the second content.

6. An intelligent interaction device, comprising:
    a touch screen,
    one or more processors coupled to the touch screen, and
    a memory for storing one or more programs that, when executed by the one or more processors, cause the one or more processors to implement the method of claim 1.

7. An intelligent interaction device, comprising:
    a touch screen,
    one or more processors coupled to the touch screen, and
    a memory for storing one or more programs that, when executed by the one or more processors, cause the one or more processors to implement the method of claim 4.

8. A non-transitory computer readable storage medium, storing a computer program, wherein the computer program, when executed by one or more processors, implements the intelligent interaction method of claim 1.

9. An intelligent interaction device, comprising:
a touch screen,
one or more processors coupled to the touch screen, and
a memory for storing one or more programs that, when executed by the one or more processors, cause the one or more processors to implement the method of claim 2.

10. An intelligent interaction device, comprising:
a touch screen,
one or more processors coupled to the touch screen, and
a memory for storing one or more programs that, when executed by the one or more processors, cause the one or more processors to implement the method of claim 3.

11. An intelligent interaction device, comprising:
a touch screen,
one or more processors coupled to the touch screen, and
a memory for storing one or more programs that, when executed by the one or more processors, cause the one or more processors to implement the method of claim 5.

12. A non-transitory computer readable storage medium, storing a computer program, wherein the computer program, when executed by one or more processors, implements the intelligent interaction method of claim 2.

13. A non-transitory computer readable storage medium, storing a computer program, wherein the computer program, when executed by one or more processors, implements the intelligent interaction method of claim 3.

14. A non-transitory computer readable storage medium, storing a computer program, wherein the computer program, when executed by one or more processors, implements the intelligent interaction method of claim 4.

15. A non-transitory computer readable storage medium, storing a computer program, wherein the computer program, when executed by one or more processors, implements the intelligent interaction method of claim 5.

* * * * *